United States Patent [19]

Sadler

[11] 4,022,146
[45] May 10, 1977

[54] FLUID PRESSURE CONTROLLED CIRCUIT BREAKER AS BOAT SAFETY APPARATUS

[76] Inventor: Clinton P. Sadler, 6069 Beechwood, Haslett, Mich. 48840

[22] Filed: Sept. 15, 1975

[21] Appl. No.: 613,208

Related U.S. Application Data

[63] Continuation-in-part of Ser. No. 446,125, Feb. 27, 1974, abandoned.

[52] U.S. Cl. ................................ 115/76; 180/101; 180/102; 200/220
[51] Int. Cl.² ........................................ B63H 19/00
[58] Field of Search .................... 115/.5 R; 9/7; 180/99–102; 340/278

[56] References Cited

UNITED STATES PATENTS

| | | | |
|---|---|---|---|
| 1,969,929 | 8/1934 | Heden | 180/101 |
| 2,093,419 | 9/1937 | Coleman | 200/220 |
| 2,758,218 | 8/1956 | Poznik | 180/101 |
| 3,786,892 | 1/1974 | Horton | 180/99 |
| 3,807,343 | 4/1974 | Peebles | 180/102 |

Primary Examiner—Trygve M. Blix
Assistant Examiner—Stuart M. Goldstein

[57] ABSTRACT

This invention relates to a marine safety apparatus for preventing accidents in small watercraft. The device interrupts the watercraft power plant when the watercraft operator is displaced from the operator's seat. The principal aspect of the disclosure is an air bladder seat cushion connected to an air pressure actuated electrical switch. The pressure from the weight of a seated operator's body is transmitted to actuate the switch between "on" and "off", according as to whether the operator is seated or not. The switch in turn actuates or de-actuates engine operation, normally by interruption of an ignition system. An additional feature is provided to override the foregoing safety system, at low speeds. Also a pneumatic delay is disclosed whereby circuit interruption is delayed slightly after seat lift-off of the operator, to preclude engine stop due to momentary lift-offs upon encountering minor water turbulence.

5 Claims, 13 Drawing Figures

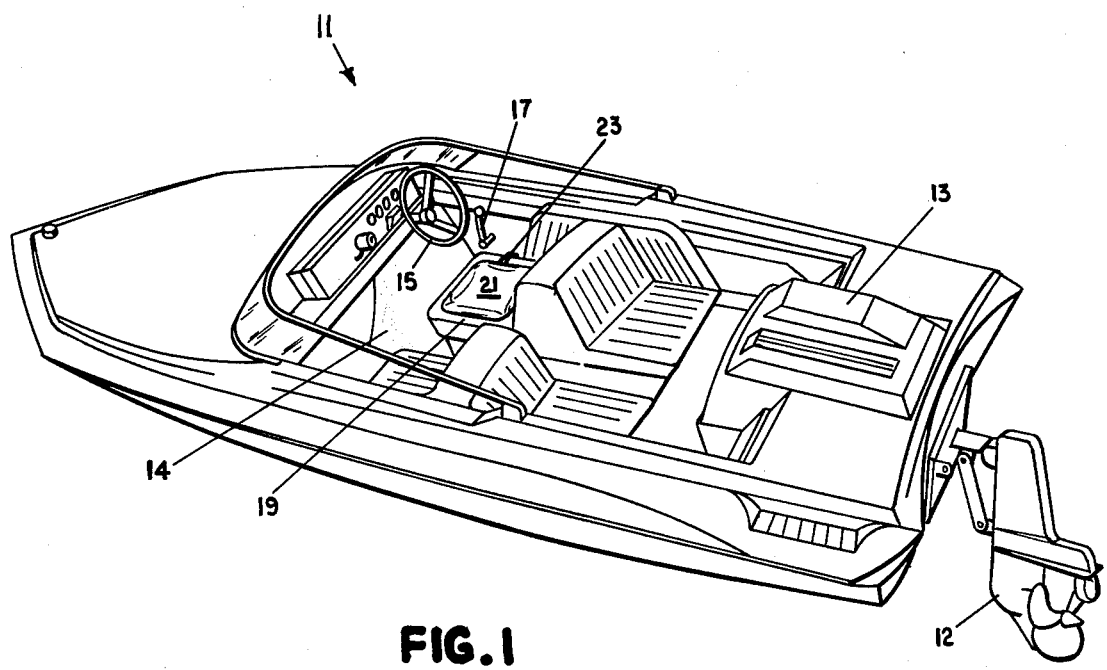
FIG. 1
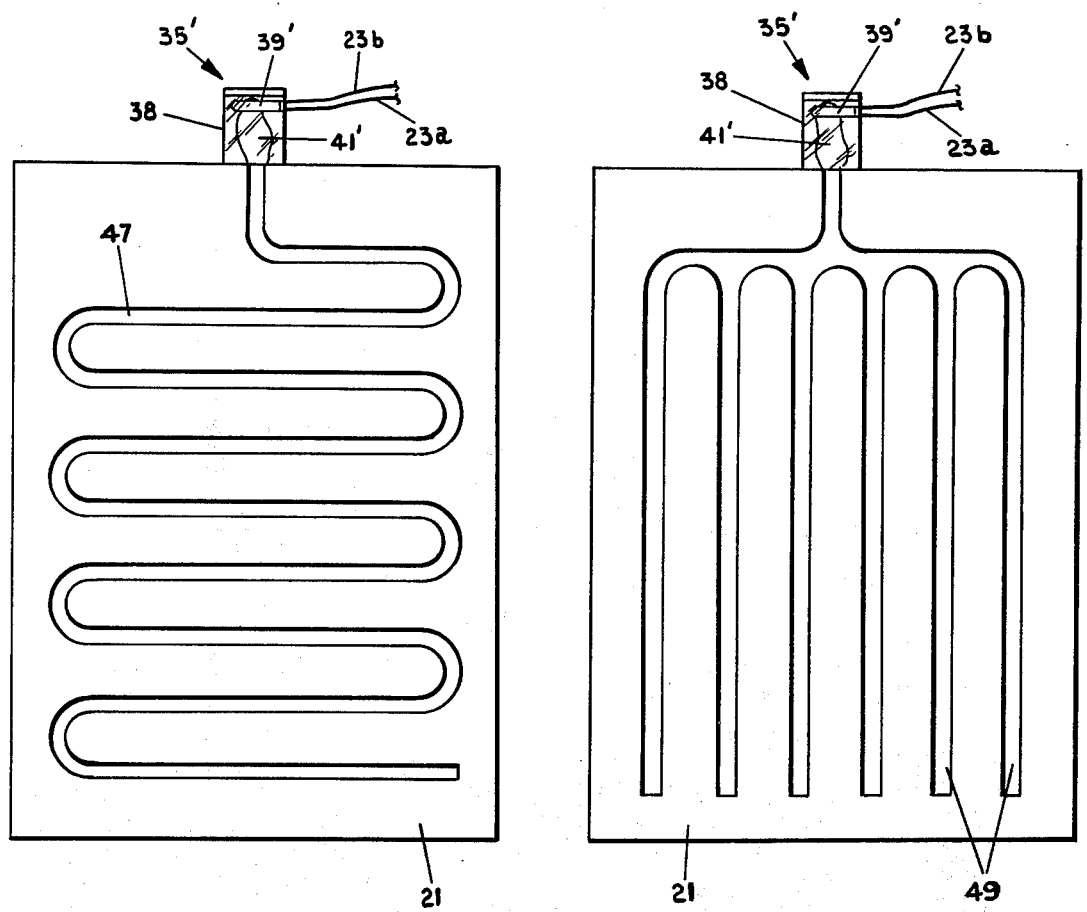
FIG. 4a
FIG. 4b

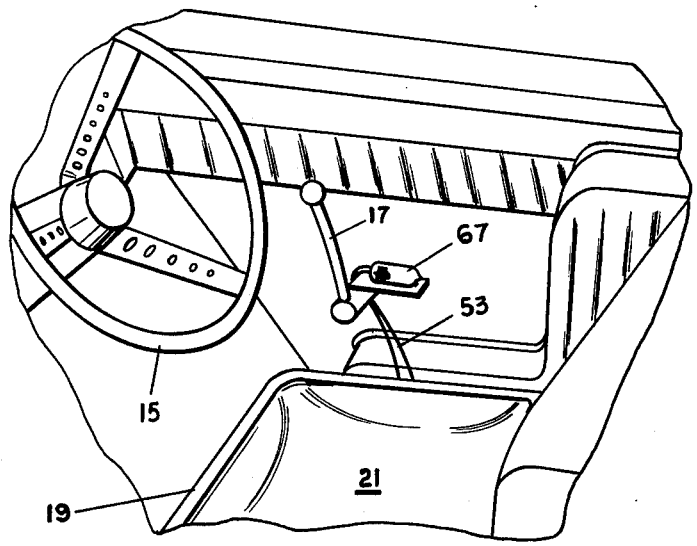
FIG. 5a
FIG. 10
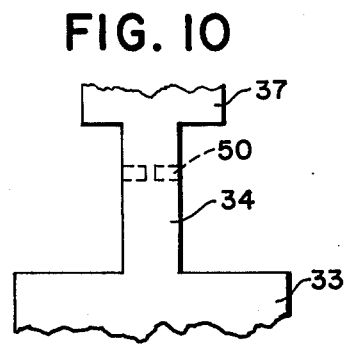
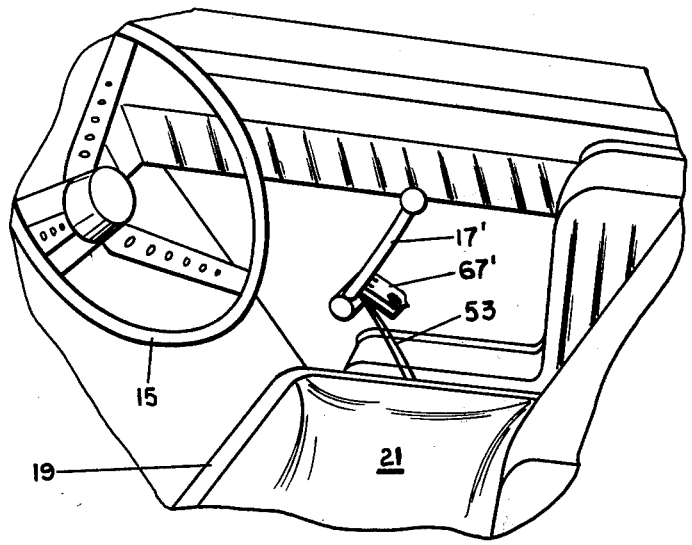
FIG. 5b
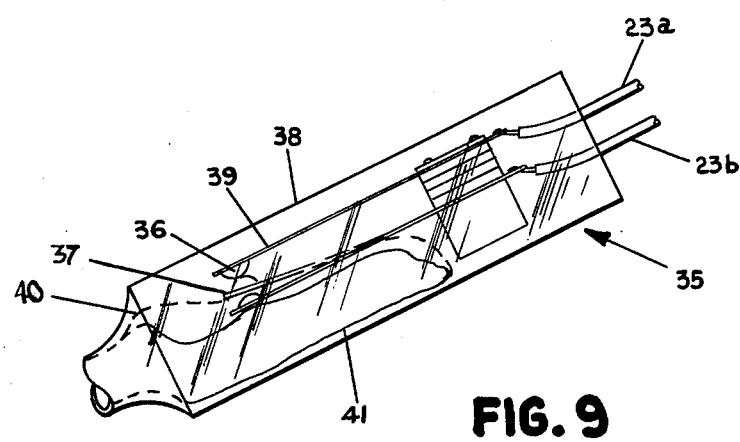
FIG. 9

FLUID PRESSURE CONTROLLED CIRCUIT BREAKER AS BOAT SAFETY APPARATUS

BACKGROUND OF THE INVENTION

This is a continuation-in-part application of my earlier co-pending application entitled "Watercraft Safety System", Ser. No. 446,125, filed Feb. 27, 1974 (now abandoned), which adds to that application subject matter relative to means for time delaying the function of the apparatus of said parent application.

Marine safety has become of steadily increasing concern both to public and private agencies alike. A central reason for this increase is the proliferation in the numbers of pleasure craft plying the waterways of their country and others. The increase in numbers of these crafts is due in large part to the increase in population, coupled with increases in the annual amounts of family disposable incomes. As a consequence there has been a steady upsurge in the amount of money spent upon, and time devoted to, recreational water activities, not the least of which has been small boating activity. This increase in recreational and other non-commercial water craft operation has naturally led to a greater frequency of water craft accidents. Moreover, rising affluence and available leisure tends to produce not only an escalation in the absolute numbers of boat devotees, but also a higher ratio of accident-susceptible navigators within their absolute numbers. This phenomenon is no doubt attributable to the fact that the situation, as hereinbefore described, would normally yield an increased proportion of weekend and vacation boaters. Such persons are less likely to possess the requisite level of seamanship training, and are more likely to utilize watercraft under pressure situations resulting from the compacted time restraints of vacation or weekend excursions. The described situation also results in an increased ratio of youthful boat operators, who tend to impetuous conduct generally.

I have become concerned with a particular accident, namely that which occurs when a boater ventures to pilot from an unsafe position. In most if not all small crafts the proper and safe operating position is seated in the operator's seat behind the steering wheel. This seat is normally situated low in the boat, so as to situate a properly seated driver within structural constraints, thereby preventing his being thrown overboard should the boat lurch or heave. However, there is a tendency on the part of many motor boaters to sit elsewhere than on the driver's seat; for example, seated on top of the back rest portion of the seat, or seated on the gunwale of the boat, or on its cockpit coaming. In such an orientation the boat operator is in serious jeopardy, inasmuch as small craft are dangerously subject to sudden multiple and/or irregular wave motions. Almost any movement can be generated upon wave contact, depending upon a number of variables, such as the relative attitude of the boat to the wave on impact, the size and configuration of the wave, and the number of waves encountered in a unit of time. As a consequence the boat may lurch sideways or upwards, or suddenly roll, yaw, or pitch, or encounter a devastating combination of such motions. In any case, these sudden, irregular movements will commonly pitch an improperly seated operator overboard, from whence any number of tragic events can follow. The operator may drown or be struck by his own or another craft, from which severe injury can result due to direct impact, or due to being seriously injured otherwise, as for example by a marine propeller. Not only is the driver of the boat in jeopardy but likewise jeopardized is the personal safety of any passengers, inasmuch as the boat can be anticipated to continue its unpiloted forward motion until it is stopped by a collision or it capsizes. While unpiloted the boat may react so as to throw other passengers out, or injure them inside the boat. The craft will then proceed to collide with another boat or strike some shoreline object such as a dock or the like, with which is associated a likelihood of further injury to passengers and non-passengers alike. Independently of potential injury to passengers and other persons, there exists a serious risk of property damage to the boat or to whatever property it may collide with. If there should be swimmers in the area, they are exposed to an extreme danger of being struck by the boat or being injured by the propeller of the boat. Any of the aforementioned accidents, in addition to the direct injury inflicted, presents a real possibility of drowning.

In water skiing activity boat operators are often observed to vacate the normal seat position in favor of an unsafe elevated disposition, on the back of the driver's seat or on the side of the boat. Presumably this disposition gives the operator an improved rear view from which to better observe the water skier. However, on account of the hazards hereinbefore described, a most basic water skiing safety rule has developed to the effect that the driver should remain normally seated and always carry a companion in the boat for the purpose of monitoring the water skier's situation. My invention would effectively force water ski boat drivers to observe this basic safety rule. In fact, my invention would more broadly have the effecto of compelling the driver of any boat equipped with my invention to observe the most basic safety rule of small motor boating, namely that the operator remain seated at all times upon the driver's seat.

As further background to this invention, it should be appreciated that willful vacation of the safe driver's seat position is not the only cause of boating accidents of the type herein described. For example, encounter of the craft with a turbulent water condition or the execution of an excessively sudden or violent maneuver (or combination of the foregoing) can cause a passenger or driver to be thrown overboard, or if not overboard at least to be displaced from his or her seat. In the case of a driver the consequence is that of a self-propelled water vehicle continuing under power in uncontrolled fashion. Little imagination is required to visualize the disastrous potential, which again includes the portent of collision and/or drowning, if the marine vehicle is not immediately powered down. Thus it is seen to be extremely desirable and beneficial to insure, by some means, that any powered water vehicle be instantly decelerated in response to evacuation of the pilot's or operator's station.

The hazards outlined thus far are so serious as to have been recognized by various legislatures, one example being Section 79 of the Michigan Marine Safety Act (No. 33 of 1967; MSA 18.1287) which reads:

Any occupant or operator of any vessel underway on the waters of this state shall not sit, stand or walk upon any portion of the vessel not specially designed for such purpose, except when immediately necessary for the safe and reasonable navigation or operation of the vessel.

My invention effectively precludes such hazardous activity by a vessel operator, as a matter of practical reality, and without resort to legislation or enforcement procedures. My invention accomplishes this result be providing means, in the driver's seat or seat cushion or other situs, such as the deck, which means are responsive to the force exerted by the weight of a normally positioned operator. Seat pressure responsive means are electromechanically connected to the ignition system of the water craft so that release of the driver's seat pressure causes interruption of the engine function. In other words, if the driver stands up or otherwise displaces himself from the normal operating position, the boat motor is automatically shut off. Thus the hazards related to unsafe operator positions are eliminated.

Consequently, it is an object of my invention to teach an apparatus for greatly increasing the safety of small boat operation.

It is another object of my invention to provide a mechanism which will all but eliminate the risk of boating accidents arising from failure of a boat operator to adhere to the basic rules of safe driving position.

It is yet another object of my invention to disclose a relatively simple and inexpensive apparatus for preventing marine accidents occuring by reason of the boat pilot being pitched overboard while the boat is under power.

It is a further object of my invention to teach a device which will significantly diminish the frequency of small boat accidents and thereby will likewise diminish the frequency of serious injuries to property and persons which are commonly associated with such accidents.

It is still another object of my invention to teach an invention for saving lives by prevention of many small boat accidents which would, but for my invention, conclude in a tragedy of death, by drowning or otherwise.

IN THE DRAWING

FIG. 1 is a pictorial representation of a typical small pleasure boat designed for recreational yachting. This view shows a typical seat arrangement and in particular shows the driver's seat and boat controls, including steering wheel and throttle. It also shows the outboard propeller drive mechanism on the stern of the craft, for purposes of demonstrating the iminent danger of the propeller to any person in the water.

FIG. 2 is a top plan view, partially broken away, showing a motor boat driver's seat and means therein for sensing the presence or absence of the driver's weight on said seat, and more particularly showing an air bladder as the seat pressure responsive mechanism. Also shown is an air pressure conducting tube for transmitting seat pressure to a device for motor boat engine interruption; the view also includes schematic representations of said engine and an override means for deactivating the entire air pressure responsive ignition interrupt system FIG. 3 is a pictorial view of an alternative embodiment of a waterproof air operated electrical switch showing a switch chamber containing an air bladder between electrical contact arms which are forced apart for breaking an electrical circuit upon introduction of air pressure into the bladder through an air line.

FIG. 4a is a top plan view of the interior of a motor boat seat cushion structure showing an alternative configuration of seat pressure responsive air bladder, namely a serpentine, or coiled, configuration.

FIG. 4b shows still another configuration of seat pressure responsive air bladder, namely a manifold branched configuraton.

FIG. 5a is a fragmentary pictorial view showing the driver's seat portion of the passenger compartment or cockpit of a motor boat and particularly depicts the steering wheel, seat cushion, and throttle structures therein, and also shows a tiltoperated mercury switch connected to the throttle lever to cause an electrical override of the engine interrupt safety system of the present invention.

FIG. 5b is a fragmentary pictorial representation of a portion of a motor boat cockpit similar to that shown in FIG. 5a, except that the motor boat throttle lever is shown at an alternate setting corresponding to a lower speed than that shown in FIG. 5a, with the throttle-mounted safety system override switch shown tilted in correspondence to the alternate throttle setting.

FIG. 9 is a pictorial view of a pneumatic kill switch with air bladder means in a waterproof switch compartment wherein the bladder expansion closes electrical circuit making contacts.

FIG. 10 is a partial view of the pneumatic connection between the seat cushion bladder and the pressure responsive means of my invention, and particularly showing, in broken line, a constriction in the air passage of said pneumatic connection.

DESCRIPTION OF PREFERRED EMBODIMENTS

Figure 3:
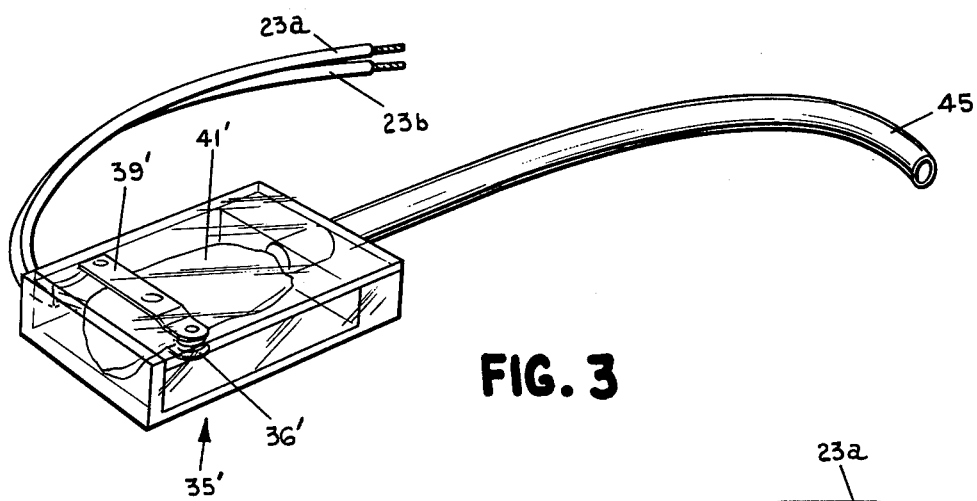

Referring to the drawings, in FIG. 1 is seen a typical open cockpit water craft of the kind commonly seen in recreational use, both in inland waterways and along the coasts, in the United States and elsewhere. Although the drawings herein represent the invention to be utilized on an open cockpit type of craft, the principle is equally applicable to large and small craft alike, and whether or not such craft are equipped with closed or open cockpits; the principle being that any boat (with the possible exception of some very large or very specialized craft equipped with highly sophisticated piloting and/or navigational gear) presents a hazardous potential when the pilot is not properly situated at the station designed for him. The safe operation of small craft normally calls for the pilot to be seated, except at very low vessel speeds. In some larger vessels piloting may be proper from a standing position, but nonetheless the pilot should not leave the piloting station except under very limited circumstances, such as slow vessel speed in calm open water, or the like. Although I describe my invention in the setting of small craft where safety would dictate seated operation, the invention can obviously be extended for application to other types of craft where standing vessel operation would be permissable. In such applicaton, instead of the body pressure sensing apparatus being situated in the seat portion of the pilot's station, it could be situated for example in the floor portion so that it would detect the presence or absence of a standing boat operator. Thus it would not mandate seated operation, but would sense a standing pilot's body weight and function accordingly, to prevent the pilot from carelessly walking about the boat while it is under way.

Referring again to FIG. 1, small craft 11 is shown driven by motor 12 contained in engine compartment 13, and controlled from within cockpit area 14 in which can be seen steering wheel 15 and throttle lever 17. The proper position for the operator of the boat is seated in the driver's or pilot's seat 19, upon which is disposed a seat cushion 21. Contained within seat cushion 21 is seat pressure responsive mechanism, more particularly described hereinafter, from which electrical wires 23 lead to the ignition circuit of the boat engine. It should be appreciated that although an inboard situated engine is shown, the principles of the present invention are equally applicable to water craft with outboard and other types of power plants.

Figure 2:
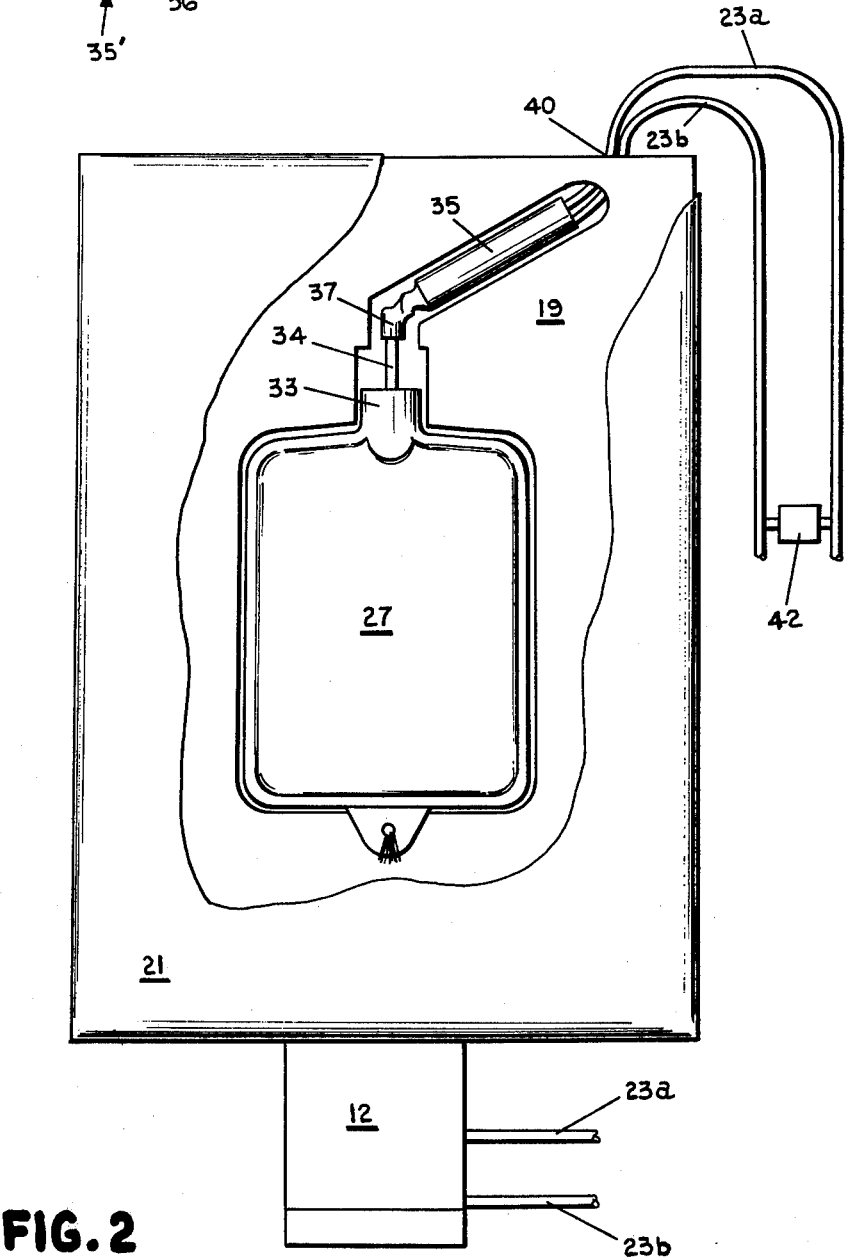

In FIG. 2 can be appreciated the seat support structure or surface 19, underneath the broken away seat cushion 21, upon which is supported an air bladder structure 27, sometimes hereinafter referred to as the seat pressure bladder. Seat pressure bladder 27 is formed of normal air bladder material, such as rubber or other durable, flexible, airtight composition. The particular bladder 27 shown in FIG. 2 can be not unlike the structure of an ordinary hot water bottle, forming a substantially rectangular platform with relatively thin cross-section (so as to be conveniently encased within a boat seat cushion), and having an outlet 33 at one end from which an air exit pipe 34 leads to an air switch 35 via coupler 37.

The air switch 35 is better appreciated by reference to FIG. 9, which shows it to be comprised of a pair of normally opened electrical contacts 36, situated between switch bladder 41 and switch compartment 38. The switch contacts are held normally open by any convenient means, such as spring-loading or by the inherent resilience of the contact arms 39. The air switch bladder 41 is smaller in size than the larger seat pressure bladder 27, and it is normally formed of a thinner membrane, so that it is sensitive to small pressure changes and inflates or deflates, accordingly. The structure of the air switch bladder relating to its size, shape, and membrane structure, can be appreciated by likening it unto the structure of an ordinary balloon, in a substantially deflated configuration. The switch contact arms 39 and their electrical contact elements 36 being situated between the bladder 42 and the air switch compartment 38, a small inflation of the bladder 41 to alternate positon 40 compresses the contact arms 39 together to alternate position 37, whereat the contacts 36 close, thereby completing the circuit in which they are contained, via connecting wires 23a and 23b. This circuit is interposed in series with the engine ignition circuit so that engine ignition is enabled, until the boat driver, voluntarily or otherwise, is displaced from his normal seated orientation, whereupon his body pressure on the seat bladder 27 is relieved, thereby decompressing seat bladder 27 and diminishing the pressure in switch bladder 41. The switch arms 39, then separate to kill the engine ignition and stop the vessel's forward motion.

The contacts 36 must be designed so that they close against normal bladder system pressure, i.e., when the seat bladder is unloaded. The "unloaded" or "no-load" pressure may be determined by whatever seat weight is considered sufficient to indicate the presence of a competent pilot for the water craft. Some weight in the neighborhood of 50 to 75 pounds would be preferred. It is important not to design the contact arms 39 so as to be separated only by an absolute no-load condition, for in such a design minimal seat pressures such as those exerted by a package or other object randomly placed on the driver's seat would prevent the contacts from opening in the event of operator seat evacuation (by the driver going overboard, for example), and would thereby defeat the primary function of the safety system. Also, such a no-load design would facilitate undesirable overriding of the safety system by irresponsible boat operators, since they could accomplish this by simply placing a relatively small, light object on the driver's seat while they continued to operate the boat in careless fashion from an improperly seated position.

On the other hand, the load point for actuation of the safety system should be designed so as not to require an excessive weight to close the contacts, otherwise only persons possessed of a very substantial body mass would be able to exert the quantum of seat force prerequisite to operaton of the water craft. An additional factor to be considered, of course, is that the seat force exerted by a human body is not exactly the same as its full body weight, inasmuch as some of the body weight is supported at the feet of the person operating the boat, and another portion of his weight may be absorbed by some boat structure other than that of the seat (depending upon how much the operator may lean on the cockpit side, the seat back, the steering wheel, or other portions of the boat structure).

In operation, therefore, the system is actuated by the presence or absence of a substantial downward force on the driver's seat cushion 21 to compress the seat bladder 27. Decompression of bladder 27 is caused by operator seat evacuation e.g., the driver is thrown from the seat through an encounter of the craft with irregular water surface of with other objects in the water, or even by running aground, or the driver suffers a disabling seizure, or falls overboard, or perhaps he voluntarily evacuates his station in a negligent manner. In any such event, the seat evacuation will remove the seat force pressure on the cushion 21 and also the underlying seat bladder 27, which is pneumatically connected to the air switch 35, and break the marine ignition circuit through connections 23a and 23b.

It should be appreciated that the components of a marine safety system such as the one described herein, will be continuously exposed to the deteriorating effects of water, either salt or fresh. Thus the electrical portions should be properly conduited or otherwise protected by such means as are well known to the electrical marine art. As for the mechanical and electromechanical elements, I have shown particular structures which achieve this protection: the seat bladder is made of a water bottle, or water bottle-like construction which by its very nature is impermeable to aqueous deterioration. Moreover, the kill switch is protected from water incursion by means such as are seen in FIG. 3 (discussed in more detail hereinafter) where the air switch 35' is enclosed in a plastic waterproof compartment 38, into which waterproof wires 23a and 23b, and waterproof air hose 45, are heat sealed or otherwise water-tight imbedded so as to preserve the waterproof integrity of the switch compartment. It should be noted that as a convenient structural unity and as augmentation of the waterproofing effect I have heretofore described, the air switch 35 may be encased within the water protective seat cushion 21 as is seen in FIG. 2.

Notwithstanding the desirability of the operator remaining properly seated while the boat is in motion, it is essential in certain situations at low speeds, that a boat be navigable from an unseated position. This is normally required when docking or the like, where it is necessary for the pilot momentarily to stand or otherwise displace himself from the pilot's seat in order to better view the dock structure, or surrounding docked or moored boats, and other such navigational obstacles and hazards. However, since docking takes place at very slow speeds it is not hazardous for the pilot so to operate. In order to enable such non-seated operation it is necessary that some override to the system be provided. Such an override is easily introduced by electrical circuitry bypassing the engine interrupt system, and such an electrical bypass means 42 is shown in FIG. 2 connected in parallel to the engine ignition interrupt circuit, across wires 23a and 23b. When the bypass element 42 is actuated, the engine ignition circuit is completed through it so that the engine continues to function independently of the status of the interrupt system, and irrespective of whether the boat operator is seated or not. The structure and function of the override system will be described in more detail hereinafter.

It should be apparent that a broad range of substantially equivalent alternative structures can be utilized to result in the same system, only one embodiment of which I have disclosed here. For example, instead of interrupting engine ignition by completing the safety circuit, the same result can be accomplished by the opposite process of opening the safety circuit. The circuit opening concept is expedient for application in connection with engine ignition systems which are interrupted by breaking the engine circuit by an interrupting switch connected in series with it, such as was explained in the description of FIG. 2. However, some engine ignition circuits are interrupted not breaking the ignition circuit but rather by completion of a separate "grounding" circuit to kill the engine. In such a situation a different type of air switch might be utilized, in which deflation of the air switch bladder would cause closing rather than opening of the air switch, for grounding of the engine ignition. Such an air switch 35' can be appreciated by reference to FIG. 3, in which the air switch bladder 41', contained in air switch casing or compartment 38' is pneumatically connected to the air seat bladder 27 by air hose 45, through which air pressure is conducted between the seat and switch bladders. Thus in a system utilizing this type of kill switch 35', evacuation of the driver's seat would cause decompression of bladder 37' and concomitant closing of the switch arms 39' until the circuit of wires 23a and 23b is closed by contacts 36'.

Other alternative configurations may be used instead of the rectangular shape seat pressure bladder 27, as may be appreciated by reference to FIGS. 4a and 4b which respectively show an elongate serpentine tube configuration of seat pressure bladder 47, and a manifold branched configuration of bladder 49, leading to the integrated pneumatic kill switch 35'. Moreover, the pneumatic kill switch 35 may be alternatively, and in some cases preferably, enclosed within the waterproof seat cushion, as is shown in FIG. 2, with the kill switch 35 imbedded in the seat foam 19, and its lead wires 23a and 23b exiting therefrom at 40. It should further be appreciated that the kill switch 35 or 35' may be constituted not necessarily of the specific structure heretofore descirbed, as containing a separate air bladder, etc., but rather any known pneumatic switch can be substituted componentially for the specific switch structures shown, it being merely necessary to pneumatically connect such a component to the basic seat bladder 27.

It is sometimes found undesirable if the motor boat engine is interrupted merely on account of the boat encountering ripply water, or merely due to momentary seat liftoff of the operator for the purpose of changing his position. Such temporary, nondangerous situations cause annoyance if they cause shortcuraton seat lift-offs which in turn cause frequent engine interrupt. Therefore, to avoid engine interrupt or momentary seat lift-offs, I propose the addition of a device to introduce a delay between the time of seat lift-off and engine interrupt, so that short duration lift-offs cause no interrupt at all. One method to introduce time delay is to introduce a constriction 50 (see FIG. 10) in the air passage 34 between seat bladder and air switch. The cross-sectional dimension at the constriction would control the duration of the delay, and a maximum time delay of 2 seconds is recommended. The constriction is not essential if instead a pneumatic kill switch is utilized of the type (which are available) having a built-in (selectable) time delay.

Returning now to the override system, reference is directed to FIGS. 5a and 5b, in which is seen a mercury switch 67 mounted on a portion of the throttle linkage, which moves mechanically in conjunction with motion of the throttle lever 17. The mercury switch is of the type that includes a floating globule of mercury (not shown) which moves to alternate closed or open switch positions, in response to tilting of the switch structure. Thus in the figure of 5a with the throttle 17 in a forward or high engine speed position, the mercury switch 67 is tilted to a more nearly horizontal position where it closes and consequently has no effect on the cutout circuit through lead wire 53 by which it is placed in parallel with the engine cutout circuitry. FIG. 5b, however, shows the throttle lever in an alternative position 17° corresponding to low engine speed, where mercury switch 67' is shown in a corresponding position tilted substantially away from the horizontal, completing circuit 53 and bypassing the engine interrupt circuit, thereby overriding the marine safety system. As previously explained, this permits of boat piloting without necessarily being seated on the operator's seat cushion, for low-speed maneuvering, docking, and the like.

Figure 6A:
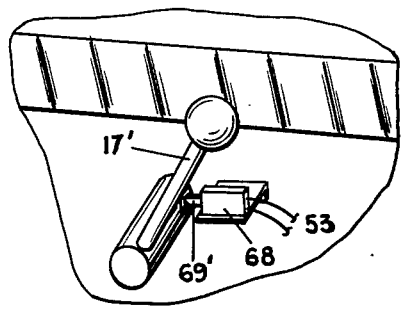
FIGS. 6a and 6b show, by fragmentary pictorial representations, the same alternative throttle settings as are represented in FIGS. 5a and 5b respectively, showing however, instead of a tilt type mercury switch, a plunger-operated microswitch.
Figure 6B:
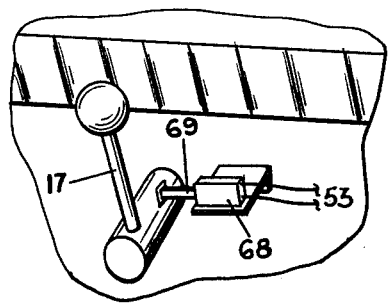

Another override switch means can be appreciated by reference to FIGS. 6a and 6b in which, instead of a mercury switch, the safety system is overridden by means of a microswitch 68 operated by direct mechanical contact of the throttle lever 17, which when displaced to a low-speed position 17' depresses switch plunger 69 to switch closing position 69' for electrical bypass of the safety circuit.

Figure 7:
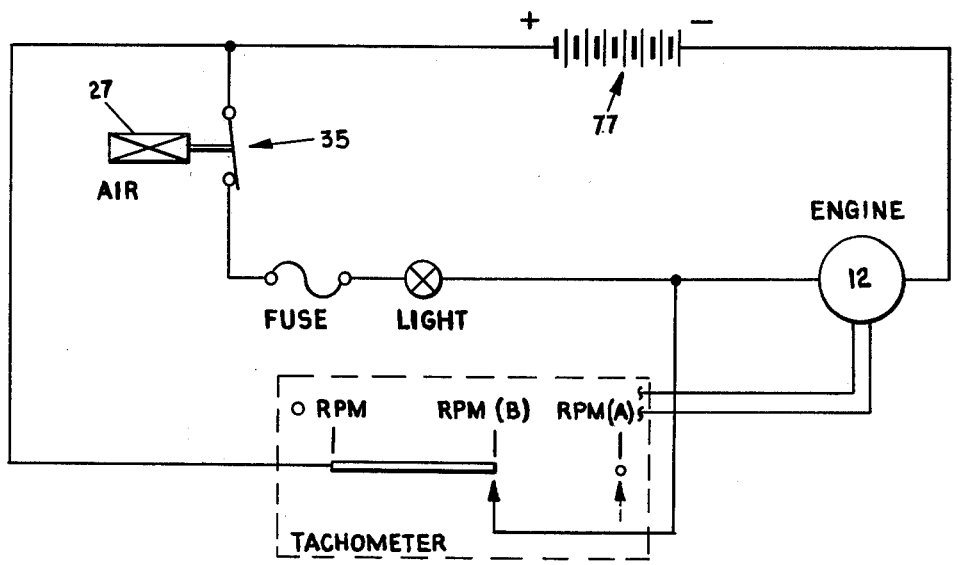
FIG. 7 is a schematic view of the entire circuitry of the marine safety system of the present invention, showing a system override utilizing tachometer means responsive to rotary engine speed in revolutions per minute.

Still another override apparatus can be provided in the form of a tachometer circuit, which senses the rotational speed of the marine engine, say in revolutions per minute, and is provided with limit switch means so as to complete a bypassing circuit at any engine speed from 0 r.p.m. to a predetermined, relatively low number of r.p.m. designated B in the schematic diagram of FIG. 7. But at a higher engine r.p.m., as for example at all speeds between those indicated by the alternate indicator arrow positions A and B in the diagram, the override circuit would be in the closed range so as to keep the safety circuit enabled. The schematic diagram includes a source 77 of electromotive force (voltage), a fuse, and a neon indicator light to show the status of the safety circuitry, as "on" or "off".

Figure 8:
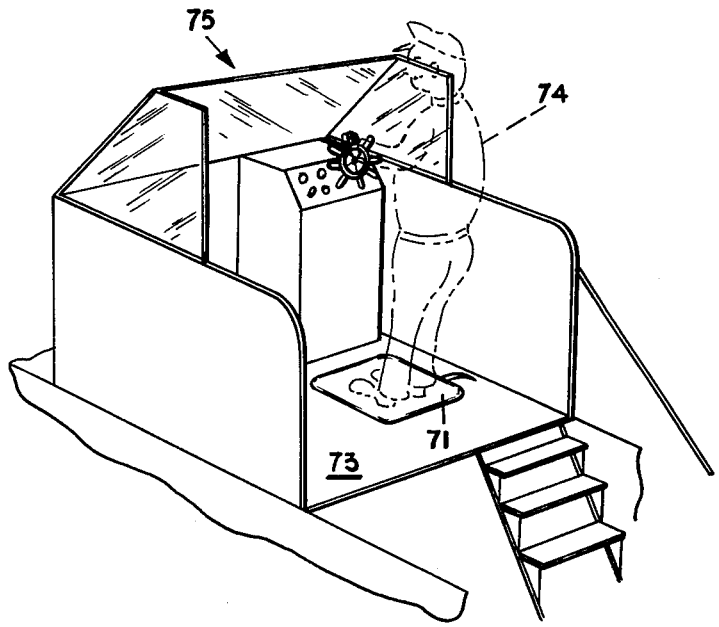
FIG. 8 is a pictorial representation of a water craft having its pilot accomodation constituted of a flying bridge design in which boat operation may be normally accomplished from a standing as well as sitting position, and depcicts a boat operator in such a standing positon, with his weight bearing on evacuation sensing means beneath his feet.

A dangerous situation already referred to above in the summary of this invention, is the hazardous operation of boats which do not, by their design, impose seated operation upon the pilot. Some boats, particularly larger pleasure craft and commercial vessels, may accommodate standing piloting, such as shown in FIG. 8. My system can be easily adapted to function in this setting, as by substituting a foot pad or cushion 71 for the seat cushion 21 of FIG. 1, to enclose the body pressure responsive bladder for engine interrupt should the standing operator 74 (shown in phantom line) be thrown from his piloting post on the deck 73 of the flying bridge 75, or should he voluntarily evacuate that position while the boat is under way at more than minimal speed.

Another aspect of my invention is that it is not necessarily limited to application with electrical ignition systems; it could be applied, for example, to a diesel engine craft, where the air switch of my invention could be employed to kill the diesel engine by solenoid or relay interconnect to the diesel engine kill switch, if it be mechanical; or by direct connection where the engine interupt is electrically actuated.

The alternative structures above have been described for the purpose merely of showing some of many possible modifications, adaptations, substitutions, and equivalent embodiments which would be obvious to anyone skilled in the related arts, and it is my intention that all of such modifications, adaptions, substitutions, and equivalents are to be included within the spirit of the invention as claimed hereinbelow.

I claim the following:

1. A safety system for a motor boat, the engine thereof having an electrically operated ignition system comprising:
    a first inflatable air bladder disposed normally to inflatedly bear the weight of an operator of said motor boat; and
    a second inflatable air bladder pneumatically connected to said first air bladder so that decompression thereof deflates said second air bladder; and
    pneumatically actuated electrical switch means in the circuit of said ignition system so disposed physically with relation to said second bladder that deflation of said bladder de-actuates said electrical switch means, so as to interrupt said ignition.

2. The apparatus of claim 1 with the additional structure comprising:
    means to delay the de-actuation of said electrical switch until after decompression of said first bladder.

3. A safety system for a motor boat, the engine thereof having an electrically operated ignition system comprising:
    an inflatable air bladder disposed normally to inflatedly bear the weight of an operator of said motor boat;
    pneumatically actuated electrical switch means in the circuit of said ignition system whereby decompression of said bladder de-actuates said electrical switch means so as to interrupt said ignition; and
    with an additional element of an override feature comprising means for automatic de-actuation of the entire safety system, responsive to a predetermined range of speed of said motor boat.

4. A safety system for a motor boat, the engine thereof having an electrically operated ignition system comprising:
    an inflatable air bladder disposed normally to inflatedly bear the weight of an operator of said motor boat;
    air pressure responsive means pneumatically connected to said air bladder so that decompression thereof operates said air pressure responsive means;
    pneumatically actuated electrical switch means in the circuit of said ignition system disposed to be actuated by said air pressure responsive means so that decompression of said bladder interrupts said ignition;
    means to delay operating of said electrical switch until after decompression of said bladder; and
    with an additional element of an override feature comprising means for automatic de-actuation of the safety system in response to a predetermined range of speed of said motorboat.

5. A safety system for a motor boat, the engine thereof having an electrically operated ignition system comprising:
    an inflatable air bladder disposed normally to inflatedly bear the weight of an operator of said motor boat;
    air pressure responsive means pneumatically connected to said air bladder so that decompression thereof operates said air pressure responsive means;
    pneumatically actuated electrical switch means in the circuit of said ignition system disposed to be actuated by said air pressure responsive means so that decompression of said bladder interrupts said ignition;
    a constriction in the pneumatic connection between said bladder and said pressure responsive means, whereby operation of said electrical switch is delayed until after decompression of said bladder; and
    with an additional element of an override feature comprising means for automatic de-actuation of the safety system in response to a predetermined range of speed of said motor boat.

* * * * *